No. 883,673. PATENTED MAR. 31, 1908.
C. W. SHEPARD.
STOVEPIPE HANGER.
APPLICATION FILED DEC. 30, 1905. RENEWED AUG. 27, 1907.
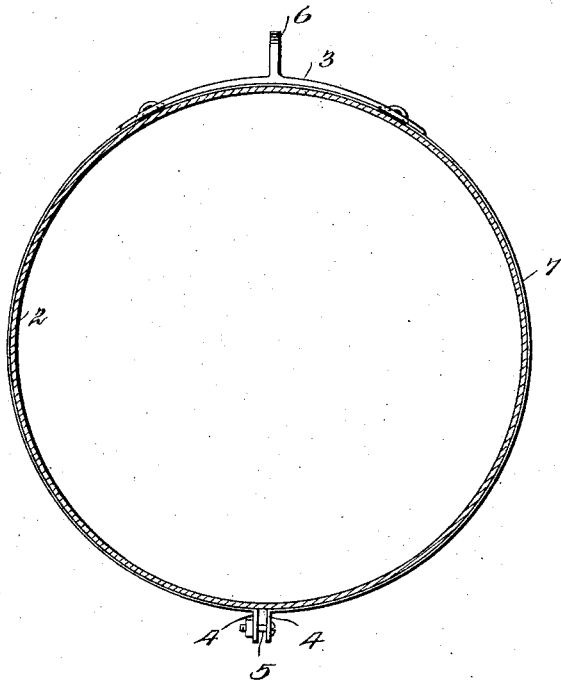
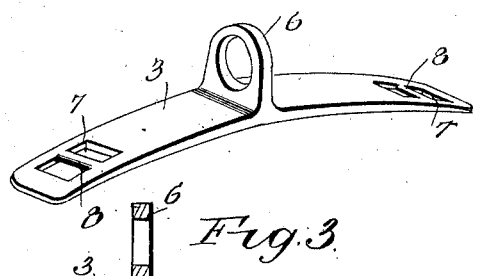
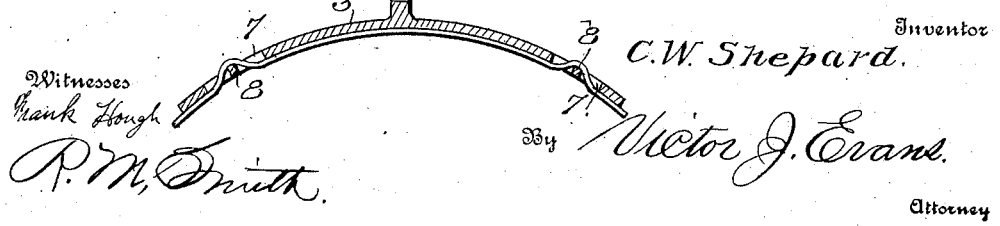

UNITED STATES PATENT OFFICE.

COLA W. SHEPARD, OF BELLEFOURCHE, SOUTH DAKOTA.

STOVEPIPE-HANGER.

No. 883,673.     Specification of Letters Patent.     Patented March 31, 1908.

Application filed December 30, 1905, Serial No. 293,989. Renewed August 27, 1907. Serial No. 390,381.

*To all whom it may concern:*

Be it known that I, COLA W. SHEPARD, a citizen of the United States, residing at Bellefourche, in the county of Butte and State of South Dakota, have invented new and useful Improvements in Stovepipe-Hangers, of which the following is a specification.

The invention relates to an improvement in stovepipe hangers comprehending specifically an attachment for the pipe adapted to permit connection of any suitable flexible support.

The main object of the present invention is the provision of means arranged for connection with pipes of various sizes and including a ring plate adapted for adjustment circumferentially of the pipe and shaped to permit the connection therewith of the usual supporting wire or chain.

The invention will be described in the following specification, reference being had particularly to the accompanying drawings, in which:—

Figure 1 is a view showing a transverse section of the pipe supplied with my improved hanger, Fig. 2 is a perspective of the ring plate. Fig. 3 is an enlarged longitudinal section illustrating particularly the connection of the band and ring plate.

Referring to the drawing my improved hanger comprises a flexible band 1 adapted to encircle a pipe section 2, and a ring plate 3 adapted for sliding connection with the band. The band may be constructed of any suitable material, though preferably a strip of sheet metal, the ends of which are bent to provide radially projecting lugs 4, which when the band is in place extend in spaced parallel relation, and are formed with openings to receive a bolt 5, the nut of which may be adjusted to bind the band 1 tightly about the pipe. The ring plate 3 comprises an elongated plate centrally provided with a laterally projecting ring 6, the plate being preferably curved longitudinally to conform to the curvature of the pipe section and being provided near each end with a plurality of spaced openings 7, arranged in alinement longitudinally of the bar, the openings at each end being separated by a transverse web 8, all as clearly shown in Fig. 2.

In use the band 1 is threaded through the openings 7 at the respective ends of the plate by passing the ends of the band upward through the openings 7 nearest the ring, over the web 8 and down through the end openings 7, so that between said openings the band underlies the plate that is between said plate and the pipe section. The ends 4 of the band are secured through the medium of the bolt 5 to clamp said band tightly in fixed relation to the pipe section, securing the ring plate in desired position. The ring 6 provides a convenient means of connection for the usual wire or chain by which the pipe section is to be supported.

It is obvious that owing to the connection between the plate 3 and the band 1, that said plate may be moved circumferentially about the pipe after the band is in place and before the ends 4 thereof are secured to clamp the band about the pipe. By this arrangement the ring plate may be adjusted to any desired position circumferentially of the pipe to properly position it for receiving the supporting wire.

While I prefer that the ends of the band be turned downward to provide the lugs 4 for service as a clamping means, it is obvious that said lugs may be separately formed and secured to the band proper.

It is obvious that the lugs 4 provide for supporting the bolt 5 spaced from the surface of the pipe section, so that in the event that two supports are needed in connection with the particular pipe section, said bolt may be utilized in addition to the ring plate.

Having thus described the invention what is claimed as new, is:—

A pipe hanger comprising a band adapted to encircle the pipe section, means for clamping the band on the section, and a ring plate provided with a laterally projecting ring and adapted for movement longitudinally of the band, said plate being formed adjacent the respective ends with transversely disposed parallel openings through which the band is adapted to pass, the band passing from beneath the plate upward through the relatively outer opening, and downward through the relatively inner opening of each pair, whereby the plate is adapted to overlie the band throughout the greater portion of the length of said plate and longitudinal movement of the plate relative to the band is permitted.

In testimony whereof, I affix my signature in presence of two witnesses.

COLA W. SHEPARD.

Witnesses:
CHARLEY A. PEARSON,
FRANK PEARSON.